(12) United States Patent
Merzig

(10) Patent No.: US 10,071,735 B2
(45) Date of Patent: Sep. 11, 2018

(54) AIRSPEED ADAPTIVE CRUISE CONTROL FOR GROUND VEHICLES

(71) Applicant: Matthew Gage Merzig, Ashburn, VA (US)

(72) Inventor: Matthew Gage Merzig, Ashburn, VA (US)

(*) Notice: Subject to any disclaimer, the term of this patent is extended or adjusted under 35 U.S.C. 154(b) by 254 days.

(21) Appl. No.: 14/685,478

(22) Filed: Apr. 13, 2015

(65) Prior Publication Data

US 2016/0297434 A1    Oct. 13, 2016

(51) Int. Cl.
| | | |
|---|---|---|
| *B60W 30/14* | (2006.01) | |
| *B60W 30/16* | (2012.01) | |
| *B60W 30/188* | (2012.01) | |
| *B60W 50/14* | (2012.01) | |

(52) U.S. Cl.
CPC .......... *B60W 30/143* (2013.01); *B60W 30/16* (2013.01); *B60W 30/1882* (2013.01); *B60W 2050/146* (2013.01); *B60W 2550/12* (2013.01); *B60W 2550/402* (2013.01); *B60W 2710/0605* (2013.01); *B60W 2710/0666* (2013.01); *B60W 2710/0677* (2013.01)

(58) Field of Classification Search
None
See application file for complete search history.

(56) References Cited

U.S. PATENT DOCUMENTS

| | | | |
|---|---|---|---|
| 6,064,937 A | 5/2000 | Yang | |
| 7,401,868 B2 * | 7/2008 | Steen | B60K 31/0008 180/170 |
| 8,311,722 B2 | 11/2012 | Zhang | |
| 8,818,678 B2 * | 8/2014 | Salinger | B60W 30/143 701/93 |
| 8,924,138 B2 | 12/2014 | Chauncey | |
| 9,053,394 B2 * | 6/2015 | Bruemmer | G06K 9/00791 |
| 2013/0173121 A1 * | 7/2013 | Tenstam | B60K 11/085 701/49 |
| 2015/0134226 A1 | 5/2015 | Palmer | |
| 2017/0021764 A1 * | 1/2017 | Adams | B60Q 9/00 |

* cited by examiner

*Primary Examiner* — Sarah Burnham McPartlin

(57) ABSTRACT

A system and method for implementing an airspeed adaptive cruise control system on ground vehicles that automatically slows vehicle groundspeed during headwinds and increases groundspeed during tailwinds. This behavior acts to reduce the energy cost associated with headwinds and capture the energy benefit obtained with tailwinds. In the method, multiple operating modes are presented that can be user selected to optimize on minimum energy consumption, fastest average speed while still harvesting energy from tailwinds, and a balance in between the two methods. The system utilizes multiple sensors, such as airspeed, groundspeed, and vehicle proximity detectors to provide reliable system functionality in a wide range of operating conditions. In some implementations, a combined speedometer with groundspeed and airspeed indicator dials is used to quickly communicate the condition and magnitude of headwinds or tailwinds.

9 Claims, 5 Drawing Sheets

AIRSPEED ADAPTIVE CRUISE CONTROL FOR GROUND VEHICLES

CROSS-REFERENCE TO RELATED APPLICATIONS

Provisional Utility Patent Application Number 61/978,356

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention relates to transportation vehicles and more particularly to transportation vehicles with automatic cruise control systems.

Cruise control systems have been developed for a wide variety of vehicles and have evolved to include a variety of features. Typical cruise control systems function by applying engine power to maintain vehicle groundspeed at a driver selected speed, relieving the driver from manually adjusting the vehicle groundspeed. Additionally, cruise control systems may have additional functions such as maintaining a given following distance from a vehicle ahead, braking when vehicles ahead are slowing down or adapting to variable ground terrain.

However, such previously mentioned cruise control systems do not directly monitor or manage airspeed for vehicles as they travel over the ground. Existing systems perform functions such as maintain groundspeed, maintain following distance or adapt vehicle groundspeed to adjust for uphill or downhill gradients in terrain. Such approaches are improvements over manual control of vehicle groundspeed, but they are not always optimal for minimizing energy consumption, particularly over longer distances where significant headwinds or tailwinds can occur that can substantially increase or decrease vehicle drag.

Due to the significant demands to reduce consumption of energy in ground vehicles, it is therefore desirable to have an airspeed adaptive cruise control system to automatically lessen the effects of headwinds and capture the benefits of tailwinds.

SUMMARY OF THE INVENTION

The invention provides a system and related methods for monitoring airspeed fluctuations encountered by a ground vehicle and adapting vehicle groundspeed to maintain a roughly constant airspeed. A ground vehicle airspeed cruise control system has the, advantage in one embodiment of maintaining vehicle airspeed as a primary set point or system goal. Upon determining the vehicle has encountered a particular type of airspeed condition (e.g., a headwind, tailwind or calm wind), the system performs an airspeed adaptive action to maintain a roughly constant airspeed. An airspeed adaptive action typically results in a change in groundspeed. The system can also provide an alert to a driver when a tailwind or headwind is encountered.

Over the course of a trip, a vehicle typically encounters variable airspeed conditions such as headwinds or tail winds. With a common existing embodiment of a cruise control device on a ground vehicle, groundspeed is maintained through variable resistance loads, such as from terrain, but does not adjust vehicle groundspeed to maintain a roughly constant airspeed. This lack of ability to incorporate vehicle airspeed increases the consumption of energy compared an adaptive approach.

An airspeed cruise control system could also be integrated with other cruise control functionality such as vehicle groundspeed, following distance or other driver automation tasks depending on the optimization goals. Example optimization goals could include maximum range, shortest travel time, greatest energy harvested from tailwinds, specific arrival time, maximum drafting from vehicles ahead, traffic congestion minimization, weather avoidance and others.

To increase performance of an airspeed adaptive cruise control system, airspeed input measurements may be averaged (e.g., with a rolling averaging function) for more accurate analysis of wind trends and to produce more gradually changing inputs into the control system. Gradually changing airspeed inputs will result in gradual acceleration changes that minimize energy consumption that would otherwise be wasted if acceleration or deceleration commands occur too rapidly. Airspeed and other inputs may also be averaged over time to provide comfort for the driver, passengers or cargo to minimize oscillatory acceleration and deceleration.

A primary goal with an airspeed adaptive cruise control system is to reduce energy consumption. With current cruise control systems, when a headwind is encountered, additional engine power is applied to maintain a groundspeed set point, requiring more energy than otherwise might be required. This is particularly true if a precise arrival time at the final destination is unnecessary. In addition, due to the physical nature of aerodynamic drag, force on a vehicle due to airspeed increases with the square of velocity. Therefore, the penalty from a headwind is greater than the benefit of an equal amount of tailwind.

For example, if driving 100 miles at 70 MPH directly into a 10 MPH headwind, then turning around to drive back 100 miles with a 10 MPH tailwind, significantly more fuel is consumed than an identical trip with zero wind. The cost of a headwind is not equally offset by an equal amount of tailwind.

For example, if a significant headwind is encountered on a trip, a significant fuel economy penalty can result using existing cruise control systems, even if a lower groundspeed set point was selected that is known to give high fuel economy performance. Or in another example, if a significant tailwind is encountered on a trip, a significant reduction in trip time could occur by increasing groundspeed, without fuel economy penalty, only when tailwinds occur.

Aircraft have historically used automatic airspeed controls commonly known as auto-throttles, to maintain a pre-set airspeed, but such systems have focused on reducing pilot workload, and maintaining aircraft controllability. Other aircraft flight management computers have adaptive optimal economy calculations integrated into their control logic, but their algorithms and optimization points are significantly different for aircraft than for ground vehicles. This difference is particularly due to the large amount of energy necessary to maintain an aircraft in flight compared to a ground vehicle maintaining speed on a road.

In addition, aircraft flight management computers do not account for frequently changing vehicle proximity or adapt to the highly variable wind environments encountered by ground vehicles when traveling on roads.

For example, when an aircraft encounters a headwind, it can be more economic to increase airspeed to get out of a headwind than decreasing airspeed. This can appear counter-intuitive because of the increased aerodynamic drag, but is in fact accurate because of the large amount of energy necessary to maintain flight, even in low speed conditions.

In ground vehicles, an airspeed adaptive cruise control system significantly advances the ability of drivers or autonomous driving systems, to automatically optimize energy consumption based on a constant airspeed rather than fixed groundspeed.

DETAILED DESCRIPTION

Disclosed herein is a system and method for adjusting vehicle groundspeed in an adaptive fashion to maintain constant vehicle airspeed and potentially reduce energy consumption compared to maintaining a constant groundspeed. The system is implemented by an electronic programmable control unit, but could also be implemented mechanically. The system performs airspeed adaptive actions when the system determines a conditional threshold, such as strong headwinds and lack of vehicle proximity, has been reached. The system may also perform airspeed adaptive actions in fully driver controlled operating condition where engine throttle sensitivity is modulated in part by vehicle airspeed.

System Architecture

Figure 1:
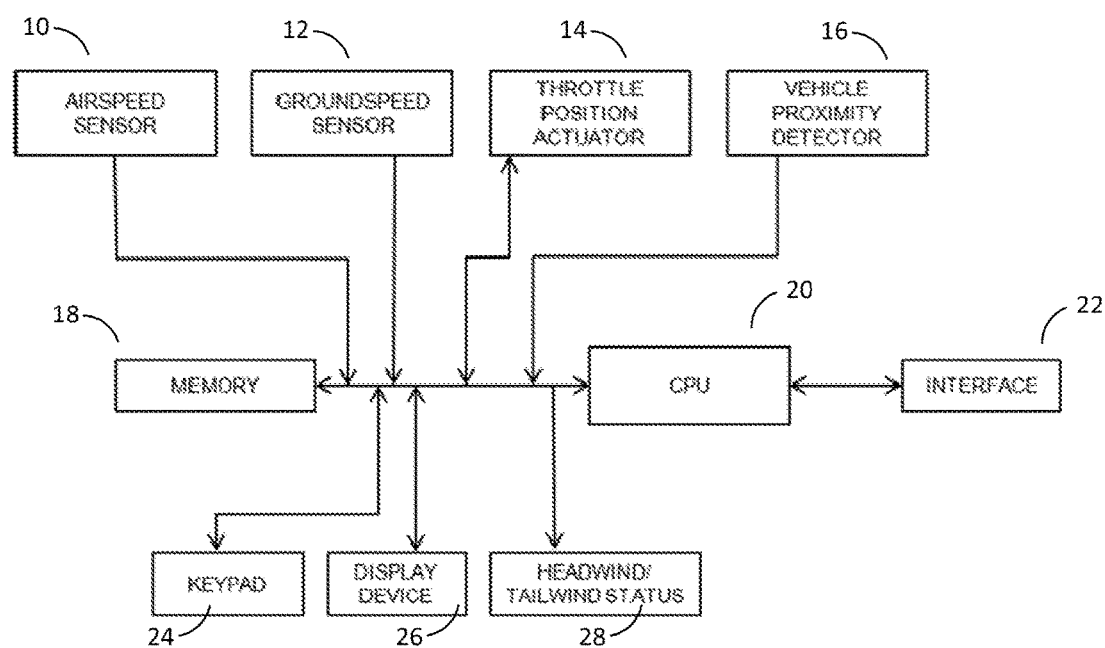
FIG. 1 is a block diagram illustrating the system architecture in a vehicle for one embodiment of the invention.

Referring initially to the drawings, FIG. 1 is block diagram outlining a preferred embodiment of the invention implemented electronically. The airspeed sensor 10 and groundspeed sensor 12 are connected to the primary communication bus. The airspeed sensor 12 could be implemented by pitot tube, paddle wheel or by ultrasonic means. The groundspeed sensor 12 could be implemented with a rotating magnetic sensor, computer vision or using a GPS receiver. The throttle position sensor 14 and vehicle proximity detector 16 is also connected to the primary communication bus. The throttle position sensor could be implemented from the existing vehicle throttle position sensor or using a retrofitted sensor. The vehicle proximity detector 16 could be implemented using computer vision, ultrasonic sensor, laser sensor or radar sensor.

Also referring to FIG. 1, the system memory 18 and system central processing unit 20 are both connected to the primary system communication bus. The central processing unit 20 provides automatic generation of appropriate outputs to perform airspeed adaptive behavior such as maintaining a constant airspeed, harvesting tailwinds, or minimizing the impact of headwinds.

Also referring to FIG. 1, an interface 22 for communication with other vehicle systems or other external outside connections such as updating firmware is provided. A keypad 24 allows the vehicle driver to configure settings such as adjustable control parameters shown in FIG. 2 or customize operating modes to fit the desired operating behavior, control system calibration, or interact generally with the adaptive airspeed cruise control.

The display device 26 is used to show real time feedback on system operation, and in some embodiments provide guidance on optimizing fuel consumption with respect to vehicle airspeed. The display device 26 in some embodiments will contain the speedometer shown in FIG. 5 that combines groundspeed and airspeed in a single instrument dial. In some embodiments, the headwind/tailwind status 28 will be displayed via a dashboard light or other simplified display system to minimize cost and provide intuitive visual cues about current airspeed conditions with respect to vehicle groundspeed.

In other embodiments of an airspeed adaptive cruise control shown in FIG. 1, a vehicle operator may not use the automatic active control directly, but have the throttle control pedal or equivalent, that results in throttle output being modulated in part by the amount of headwind or tailwind detected. This could be referred to as having a "soft accelerator pedal" that does not respond as sharply when strong headwinds are present, and a "sharp accelerator pedal" that responds more quickly when tailwinds are present.

In this partially manual operating mode, the operator avoids unnecessarily consuming energy by accelerating with the throttle into headwinds or maintaining speed into headwinds. This partially manual mode operates without the driver directly selecting an airspeed setpoint, but by the cruise system taking continuous measurements of current ground speed and airspeed conditions. In this embodiment, the vehicle operator can also benefit from increased vehicle speed without a fuel economy penalty when tailwinds occur. Also in this embodiment, the vehicle operator can benefit from full control over vehicle groundspeed for complex traffic scenarios, with a minimized fuel economy penalty due to headwinds. Also in this embodiment, the throttle output modulation can be overridden by the driver requesting a throttle position greater than a certain threshold that can be customized based upon performance requirements of the ground vehicle.

In all embodiments, the airspeed sensor is critical to enabling airspeed adaptive cruise control behavior. A number of methods exist to measure airspeed such as a pitot tube, hot wire resistance, rotating paddle wheel; and ultrasonic time-of-flight. On a ground vehicle, accurately measuring airspeed can be challenging due to local disturbances from nearby vehicles, cross wind effects, environmental conditions (e.g., dust, rain and snow), corrosive salt environments and biological residue such as from insects and birds. Other debris encountered on roads such as tire rubber, vehicle parts, trash, sand, brush, trees, and others objects are all potential sources of error and damage to a vehicle based airspeed sensor. For these reasons, pitot tube and ultrasonic based airspeed measurement are generally more reliable methods. However, for cost minimization, other airspeed measurement systems could be used such as mechanical systems.

In some embodiments, multiple speed sensors in different vehicle positions will be used to consolidate airspeed data into a single estimated value. In all embodiments, proper maintenance of the airspeed sensor is important to the accurate function of the airspeed adaptive cruise control system.

Positioning of the airspeed sensor is important for reliable functioning of an airspeed adaptive cruise control system on ground vehicles. In some embodiments, multiple airspeed sensors will be used to reduce the effects of positioning on measured airspeed. Placement at the highest feasible point on a vehicle is desirable to have undisturbed air and prevent excessive variability in measured airspeed due to vehicles ahead slowing down measured airspeed. High placement is also desirable to provide a better overall sense of the large scale prevailing wind direction. Placement of the airspeed sensor at the furthest forward position that is feasible is also desirable to minimize airspeed disturbances caused by the vehicle such a system is mounted upon.

In some embodiments, particularly where the airspeed sensor is mounted low or towards the rear of the vehicle, calibration of the airspeed sensor is necessary to account for vehicle specific airspeed variations caused by bodywork, antennas, large scale vehicle aerodynamic effects, rotating wheels and other variables. A typical calibration routine would include using a GPS based groundspeed meter along with calm environmental wind conditions to do a velocity sweep across the range of vehicle airspeeds to determine a correlation matrix of measured airspeed versus actual airspeed. It is also necessary to calibrate the airspeed sensor to ensure that the derived measurement of headwind and tailwind speed reflect actual conditions.

Figure 2:
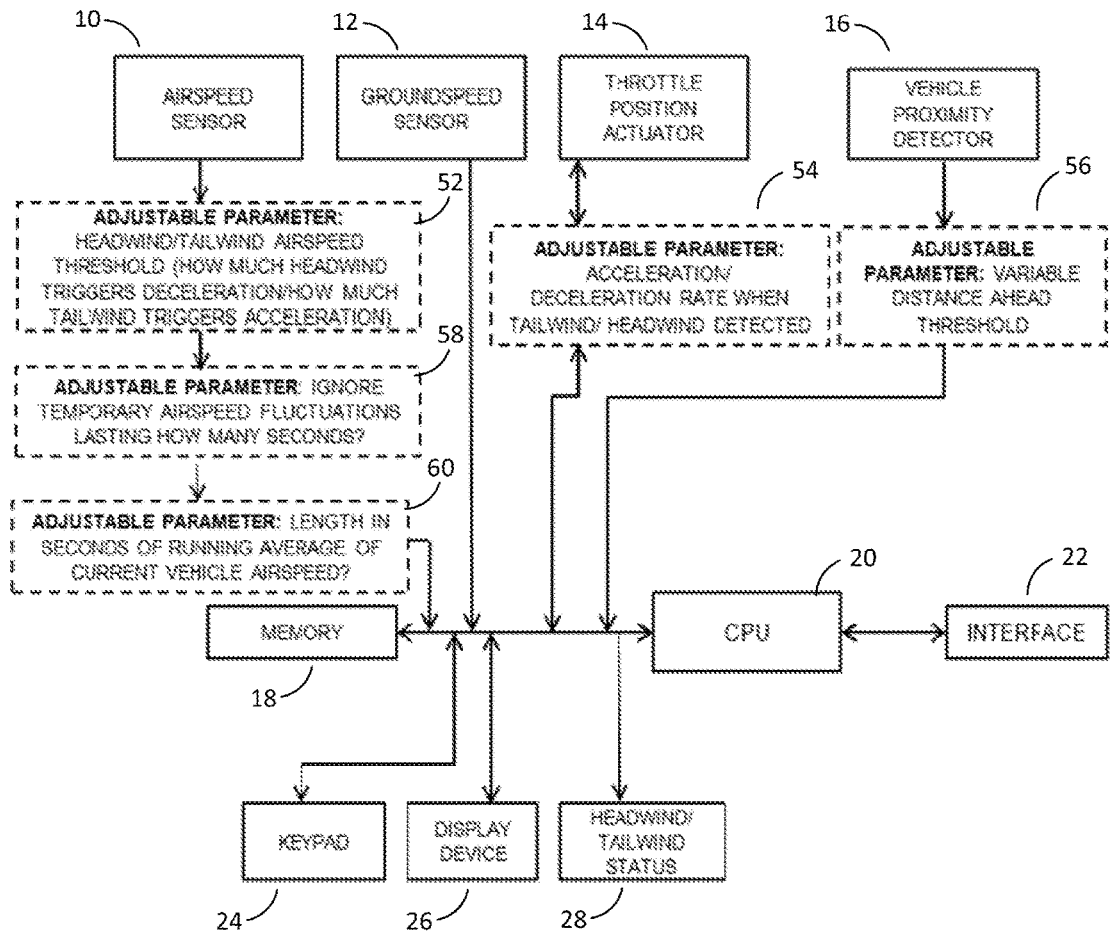
FIG. 2 is a block diagram illustrating the system architecture including adjustable parameters in a vehicle for one preferred embodiment of the invention.

In FIG. 2, the system architecture including key system tuning parameters is shown. These adjustable parameters may be enabled to be adjusted by the end user or may be pre-selected to provide certain behaviors required by vehicle operators. First, with respect to the primary airspeed sensor 10 shown in FIG. 2, the headwind/tailwind airspeed threshold 52 is a critical operating parameter that is selected to provide a reasonable balance between sensitivity and lag in triggering airspeed adaptive behavior such as acceleration or deceleration of vehicle groundspeed. The headwind/tailwind airspeed threshold 52 also controls how aggressively the airspeed adaptive cruise control system responds to headwinds or tailwinds. For example, in one embodiment, a 5 MPH detected headwind change from calm wind should not trigger airspeed adaptive behavior to improve occupant comfort.

Second with respect to the primary airspeed sensor 10 shown in FIG. 2, the length of time to ignore temporary airspeed fluctuation parameter 58 is a critical operating parameter that is selected to avoid overly frequent changes in vehicle groundspeed that could actually increase energy consumption.

Third with respect to the primary airspeed sensor 10 shown in FIG. 2, the length of time to calculate a running average of vehicle airspeed 60 is a critical parameter to ensure the air adaptive cruise control gradually adapts to changing headwind/tailwind conditions as opposed to short fluctuations caused by vehicles ahead, trees, road barriers, road signs, bridges, oncoming traffic, wind, bodies of water, open expanses of terrain and other factors that do not represent sustained headwind/tailwind effects.

In FIG. 2, with respect to the throttle position actuator 14, the acceleration/deceleration rate 54 is a key parameter to control overly sensitive vehicle movement that disturbs occupants or cargo as adaptive airspeed behavior occurs. The acceleration/deceleration rate 54 parameter also prevents excess energy consumption from unnecessarily high rates of acceleration or deceleration as groundspeed adapts to changing airspeed condition.

In FIG. 2, with respect to the vehicle proximity detector 16, the variable distance ahead threshold 56 is a key parameter to control unnecessary groundspeed changes when in the wake of a vehicle ahead. The variable distance ahead threshold 56 sets the minimum distance from the driver's vehicle to the next vehicle ahead to ignore vehicle airspeed measurements. In a condition where a vehicle is in close proximity ahead of the driver's vehicle, measured vehicle airspeed will likely indicate significantly below the prevailing vehicle airspeed and could incorrectly trigger airspeed adaptive behavior temporarily resulting in slow groundspeed.

The variable distance ahead threshold 56 parameter also allows the system to function robustly in heavy traffic and close proximity driving while still providing some of the benefits of an airspeed adaptive cruise control system when opportune conditions exist.

Overview of Operation

Figure 3:
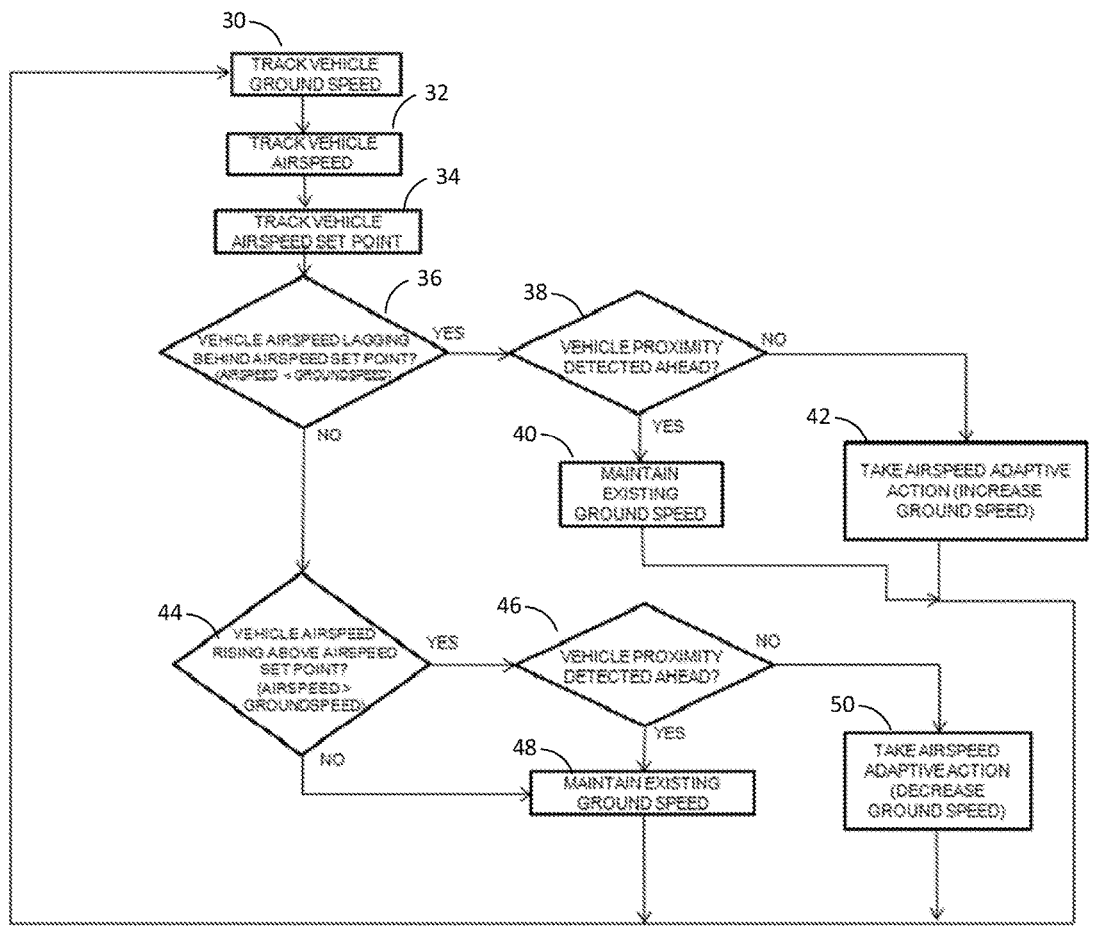
FIG. 3 is a flowchart showing an overview of an airspeed adaptive cruise control system.

In FIG. 3, a flowchart showing an overview of an airspeed adaptive cruise control system provides a detailed view of the airspeed adaptive behavior. First, vehicle groundspeed 30, as well as vehicle airspeed 32 is tracked at a specific interval and is stored in memory. The currently active vehicle airspeed setpoint 34 is also stored in memory and generally is an important input to the goal seeking baseline that controls the airspeed adaptive behavior.

When vehicle airspeed is lagging behind the airspeed setpoint at decision point 36 the next step is to check for vehicle proximity ahead at decision point 38. This prevents an unnecessary change in groundspeed 40 when driving in close proximity of other vehicles. If no vehicles are detected in close proximity, the system behaves according to tailwind conditions and increases groundspeed 42 to take advantage of the favorable tailwind operating conditions until measured airspeed is equal to the vehicle airspeed setpoint 34. This behavior results in greater vehicle groundspeed without an energy penalty.

With respect to decision point 36, if vehicle airspeed is not lagging behind the airspeed setpoint, then decision point 44 is evaluated to determine if vehicle airspeed is rising above the airspeed setpoint. If decision point 44 is evaluated true, then decision point 46 is evaluated to check for vehicle proximity. If vehicle proximity is not detected, the airspeed adaptive behavior of decreasing groundspeed 50 occurs until measured airspeed is equal to the vehicle airspeed setpoint 34. This behavior results in lesser vehicle speed to prevent an energy penalty due to headwinds. If vehicle proximity is detected then existing vehicle groundspeed 48 is maintained and the vehicle groundspeed continues until another operating iteration is evaluated to check for variable conditions that may occur.

Beyond the established flow chart behavior from FIG. 3, several user configurable operating modes can be selected to reflect the specific needs of the driver. Depending on the desired system behavior, three operating modes may be selected: compensate for headwind only, compensate for headwind and tailwind, compensate for tailwind only.

If operating mode "compensate for headwind only" is selected, then airspeed adaptive cruise control will never increase vehicle groundspeed, and only decrease groundspeed when headwinds occur. The operating mode generally provides the minimal energy consumption and slowest average vehicle groundspeed.

If operating mode "compensate for headwind and tailwind" is selected the airspeed adaptive cruise control will speed up for tailwinds and slow for headwinds. This operating mode generally provides a balance between groundspeed and minimal energy conservation, but depends upon actual headwind or tailwind encountered.

If operating mode "compensate for tailwinds only" is selected the airspeed adaptive cruise control will only speed up when tailwinds occur. This operating mode generally provides the fastest average vehicle groundspeed and can automatically harvest energy from tailwinds to be used to increase vehicle groundspeed without an energy penalty.

It is also desirable to have an upper and lower limit on the total change in vehicle groundspeed. For all the operating modes, a maximum groundspeed deviation can be selected. For example, it generally will not be desirable for the vehicle to slow below minimum posted groundspeed limits nor would it be desirable for the vehicle to exceed the maximum posted groundspeed limit. This upper and lower limit is individually selectable to allow the driver to configure the system to meet specific operating requirements.

Figure 4:
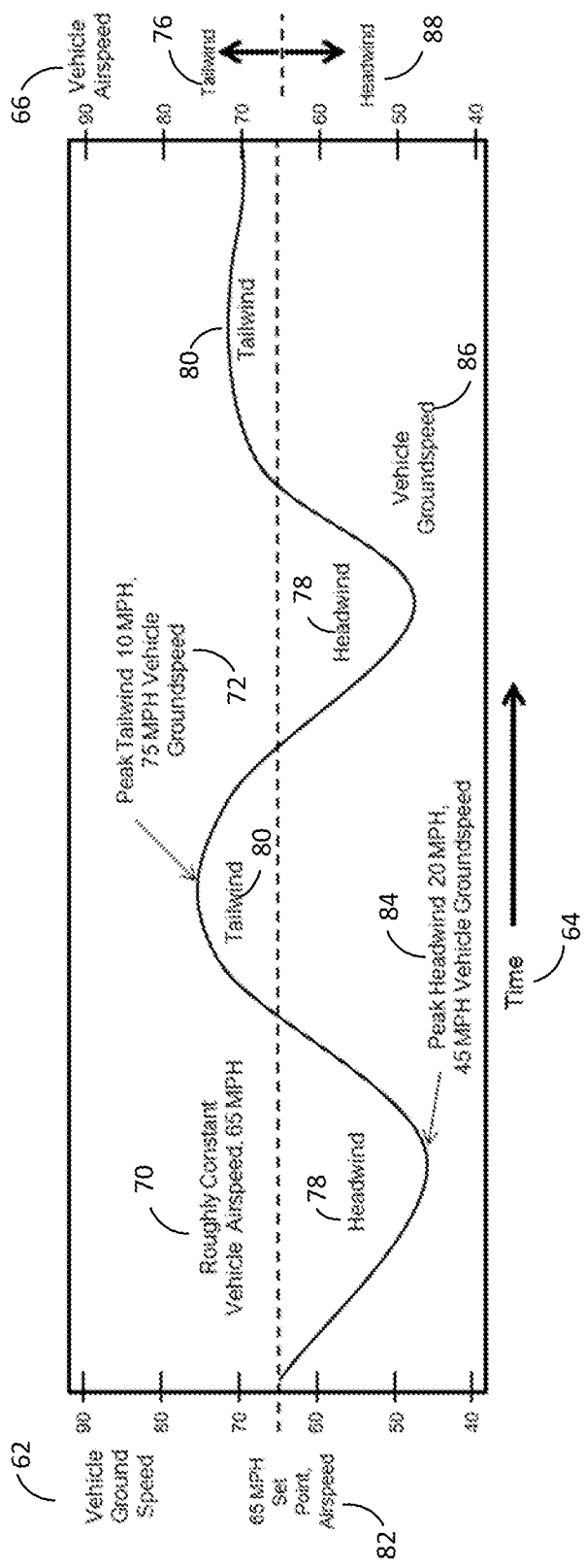
FIG. 4 is a chart plotting vehicle groundspeed and airspeed versus time as both headwinds and tailwinds are encountered.

In FIG. 4, a graphical depiction of the airspeed adaptive cruise control behavior is plotted over an extended time period 64 of more than 30 minutes. Vehicle groundspeed 86 is plotted on the left hand axis 62 while vehicle airspeed 70 is plotted on the right hand axis 66. In the middle of the chart, the 65 MPH airspeed setpoint 82 is plotted in a dashed horizontal line to give a reference of the airspeed adaptive cruise control system goal. The system goal 70 is highlighted as being roughly constant because the system does not instantaneously adjust to changes in airspeed.

In FIG. 4, peak tailwind 72 is identified as the point of maximum vehicle groundspeed at 75 MPH which correlates to a 10 MPH tailwind. Note that at this point, vehicle airspeed is still equal to the 65 MPH airspeed setpoint 82. The tailwind labels 80 show the region of tailwind functionality 36 by the airspeed adaptive cruise control system.

To further clarify when headwinds or tailwinds exist, and the specific functionality triggered during those time periods, the chart has tailwind behavior regions 76 and headwind behavior regions 88 labeled.

In FIG. 4, peak headwind 84 is identified at 45 MPH vehicle groundspeed, while simultaneously encountering a 20 MPH headwind. At this point, the airspeed adaptive cruise control has slowed vehicle groundspeed until the target airspeed setpoint is achieved. To clarify the operation in headwind conditions, the sum of the 45 MPH groundspeed and 20 MPH headwind result in the target airspeed setpoint of 65 MPH. The headwind labels 78 show the region of headwind functionality 44 by the airspeed adaptive cruise control system.

Visual Display

Figure 5:
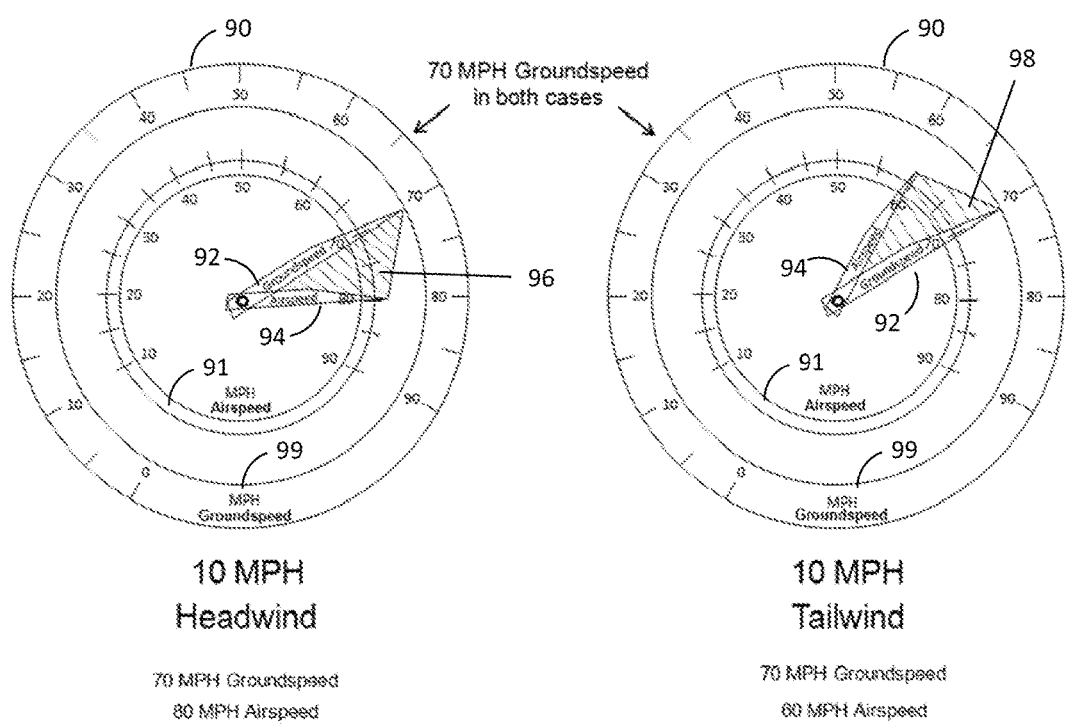
FIG. 5 is a side by side depiction of a speedometer that combines groundspeed and airspeed in a single instrument dial showing headwind and tailwind condition views when a vehicle is operating at 70 MPH groundspeed in both cases.

In FIG. 5, a speedometer that combines groundspeed and airspeed in a single instrument 90 is depicted. The instrument 90 may be implemented mechanically, electromechanically, or fully digitally using a display screen. The groundspeed dial 99 and markers occupy the outer ring, as well as the corresponding longer groundspeed dial indicator 92. The airspeed dial 91 and markers occupy the inner ring, as well as the corresponding shorter airspeed dial indicator 94.

In the headwind case of FIG. 5 shown on the left hand side, the shaded region 96 represents the magnitude of the airspeed penalty in an easily visualized method. The shaded region 96 may be colored differently than the shaded region 98 on the right hand side showing the tailwind case. Such colors as red for the headwind shaded region 96 and green for the tailwind shaded region 98 may be selected and actively displayed on a mechanical, electromechanical or fully digital representation of the speedometer 90.

Also, the area of the shaded region 96 will increase with an increasing headwind and the highlighted area of shaded region 98 will increase with an increasing tailwind. The area of the shaded regions 96 and 98 will be updated in real time, or close to real time depending on the configuration of system parameters and operating modes selected.

Although the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. For example, the invention could be adapted for use in an aircraft or on a bicycle with certain modifications. The invention should therefore not be limited by the above described embodiment, method, and examples, but by all embodiments and methods within the scope and spirit of the invention as claimed.

What is claimed is:

1. A cruise control method implemented by a computerized airspeed adaptive cruise control system in a ground vehicle with an airspeed sensor comprising the steps of:

detecting a magnitude of ground vehicle headwind by at least one airspeed sensor;

detecting a magnitude of ground vehicle tailwind by the at least one airspeed sensor;

detecting a vehicle groundspeed by a groundspeed sensor;

calculating a vehicle airspeed as the vehicle groundspeed plus the at least magnitude of vehicle headwind minus the magnitude of vehicle tailwind;

accepting a positive vehicle airspeed set point from either a vehicle operator, an autonomous driving computer or a computerized controller wherein said set point is optionally subject to limiting parameters including energy efficiency, arrival time, maximum or minimum acceptable groundspeed or comfort;

comparing the vehicle airspeed to the vehicle airspeed set point; and controlling a throttle position actuator to increase vehicle ground speed when an absolute value of the vehicle airspeed is less than the vehicle airspeed set point by more than a first threshold amount and/or decrease vehicle ground speed when an absolute value of the vehicle airspeed is greater than the vehicle airspeed set point by more than a second threshold amount.

2. A computerized airspeed adaptive cruise control system comprising:

a ground speed sensor configured to measure ground speed of a vehicle with respect to the ground;

an airspeed sensor configured to:

receive a magnitude of vehicle headwind defined as a velocity of wind moving in an opposite direction of vehicle travel and a magnitude of vehicle tailwind defined as a velocity of wind moving in the same direction of vehicle travel;

receive a measure of ground speed of the vehicle; and calculate a vehicle airspeed defined as vehicle ground speed plus the magnitude of vehicle headwind minus the magnitude of vehicle tailwind;

a throttle position actuator configured to actuate a throttle of the vehicle;

at least one computerized controller configured to:

monitor vehicle airspeed and vehicle groundspeed provided by the ground speed and airspeed sensors;

accept a positive vehicle airspeed set point from either a vehicle operator, an autonomous driving computer or a computerized controller wherein said set point is optionally subject to limiting parameters including energy efficiency, arrival time, maximum or minimum acceptable groundspeed, comfort of the vehicle operators or others;

instruct a vehicle operator to adjust the throttle position actuator and/or automatically adjust the throttle position actuator to increase vehicle ground speed when an absolute value of the vehicle airspeed is less than the vehicle airspeed set point by more than a first threshold amount and/or decrease vehicle ground speed when an absolute value of the vehicle airspeed is greater than the vehicle airspeed set point by more than a second threshold amount; and a user interface configured to receive an input from the at least one computerized controller and to provide vehicular data to the vehicle operator or an autonomous driving computer.

3. The airspeed adaptive cruise control system of claim 2, wherein the measure of ground speed of the vehicle is either a measurement taken by the ground speed sensor or is derived from data transmitted by a vehicular positioning sensor.

4. The airspeed adaptive cruise control system of claim 2, wherein the computerized controller is adapted to receive an adjustable parameter defined as a number of seconds to ignore an indication by the computerized controller to increase or decrease vehicle ground speed configurable by either the vehicle operator or the autonomous driving computer.

5. The airspeed adaptive cruise control system of claim 2, wherein the system is configured to gradually adapt to changes in the magnitude of headwind or tailwind and to be relatively not responsive to short fluctuations in the magnitude of headwind or tailwind caused by vehicles ahead, trees, road barriers, road signs, bridges, oncoming traffic, bodies of water, open expanses of terrain and other factors that do not represent sustained changes in the magnitude of headwind or tailwind.

6. The airspeed adaptive cruise control system of claim 2, wherein the magnitude of vehicle headwind and the magnitude of vehicle tailwind are either direct measurements taken by the airspeed sensor or values derived from data transmitted from weather stations.

7. The airspeed adaptive cruise control system of claim 2, wherein the throttle position actuator comprises an adjustable parameter of an acceleration and deceleration rate wherein a magnitude said adjustable parameter is configurable by the vehicle operator or automatically by the autonomous driving computer or by the at least one computerized controller.

8. The airspeed adaptive cruise control system of claim 2, further comprising a display unit comprising a combination instrument dial with airspeed and groundspeed dial indicators and a colored region representing a magnitude of headwind or a magnitude of tailwind.

9. The airspeed adaptive cruise control system of claim 2, further comprising a vehicle proximity sensor adapted to measure a distance to a vehicle in front of the vehicle with the computerized adaptive cruise control system and to receive an adjustable distance parameter defined as a minimum required distance to the vehicle in front wherein the adjustable distance parameter is configured by either the vehicle operator or automatically by the autonomous driving computer or automatically by the at least one computerized controller and wherein the computerized controller uses data from the vehicle proximity sensor to verify that an increase in vehicle ground speed will not result in a position of the vehicle with the computerized adaptive cruise control system that violates the adjustable distance parameter.

* * * * *